No. 859,226. PATENTED JULY 9, 1907.
R. G. HOWARD.
WEIGHING MACHINE.
APPLICATION FILED JAN. 21, 1907.

3 SHEETS—SHEET 1.

Witnesses:
H. B. Davis.
Cynthia Doyle

Inventor:
Robert G. Howard.
by Hayes & Harriman
attys

No. 859,226. PATENTED JULY 9, 1907.
R. G. HOWARD.
WEIGHING MACHINE.
APPLICATION FILED JAN. 21, 1907.

3 SHEETS—SHEET 2.

UNITED STATES PATENT OFFICE.

ROBERT G. HOWARD, OF NEWTON, MASSACHUSETTS.

WEIGHING-MACHINE.

No. 859,226.      Specification of Letters Patent.      Patented July 9, 1907.

Application filed January 21, 1907. Serial No. 353,237.

*To all whom it may concern:*

Be it known that I, ROBERT G. HOWARD, of Newton, county of Middlesex, State of Massachusetts, have invented an Improvement in Weighing-Machines, of which the following description, in connection with the accompanying drawings, is a specification, like characters on the drawings representing like parts.

This invention relates to weighing machines, and has for its object to provide a weighing machine with an advertising-device having a plurality of advertisements, which is adapted to be operated to successively display the advertisements and the operation of which must be effected before the weight of the person mounting or standing on the platform of the machine can be obtained.

My invention comprehends the employment of weighing-mechanism having an indicating-device which is movable back of a sight opening and which is adapted to be operated by a weight on the platform to display, at said opening, the correct weight, and a movable screen covering said opening, whereby the indicating-device is normally concealed, and an advertising-device having a plurality of advertisements and an operating-device for said advertising-device adapted to operate it to successively display the advertisements and also to operate said screen to uncover the sight opening, so that the weight on the indicating-device may be observed only when said advertising-device is operated.

Figure 1:
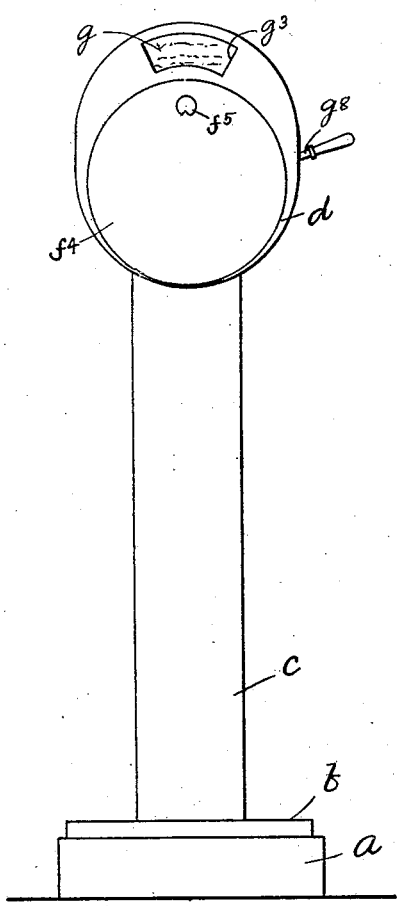
Figure 4:
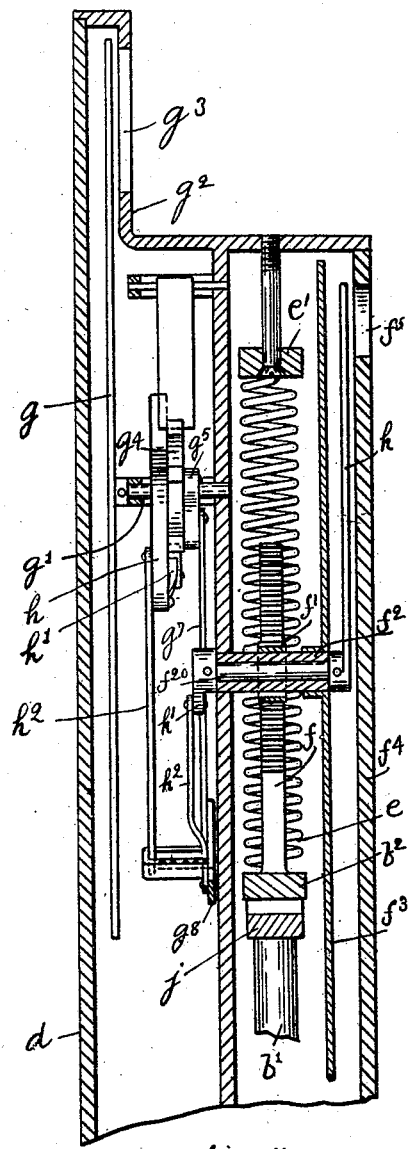
Figure 2:
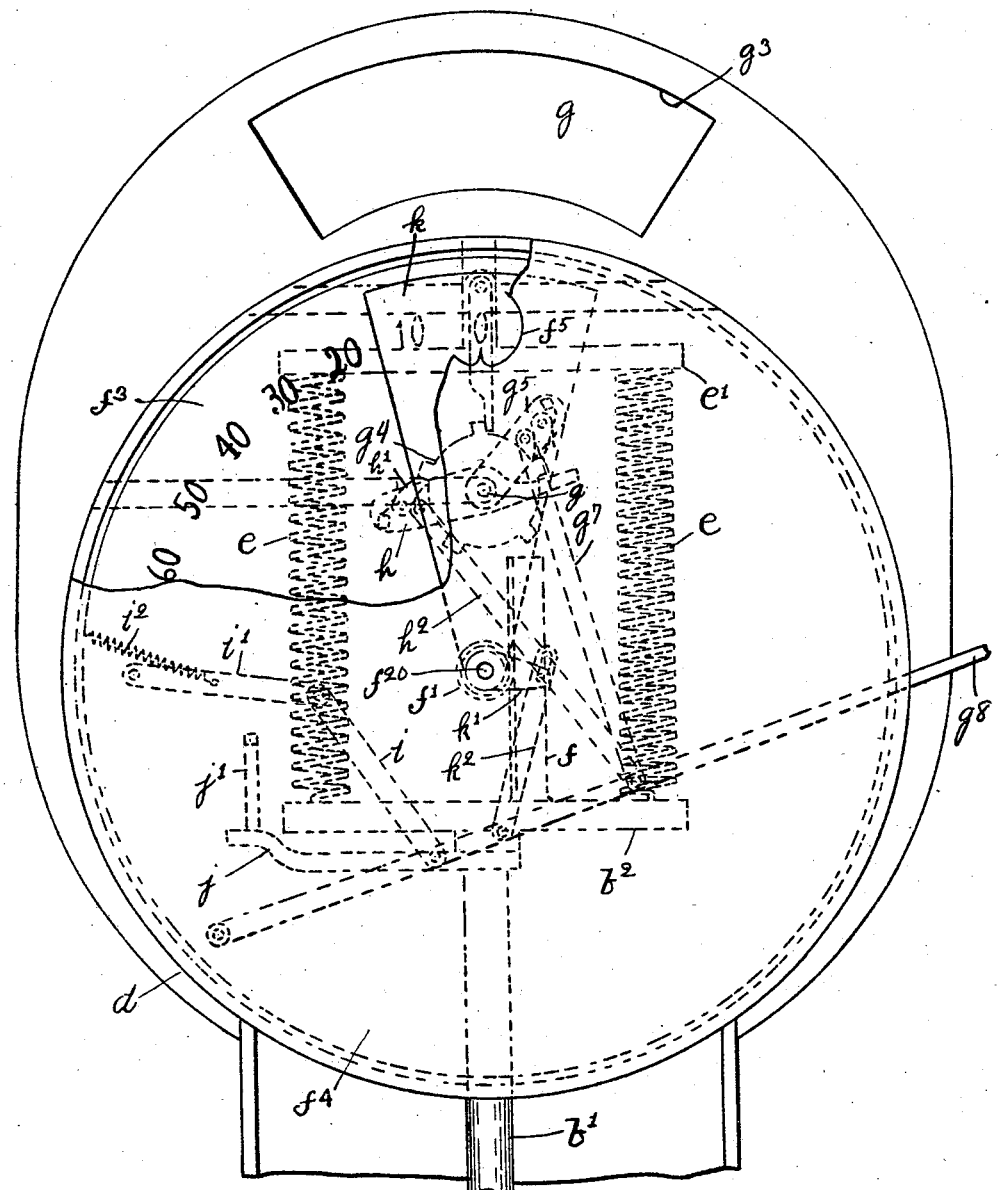
Figure 3:
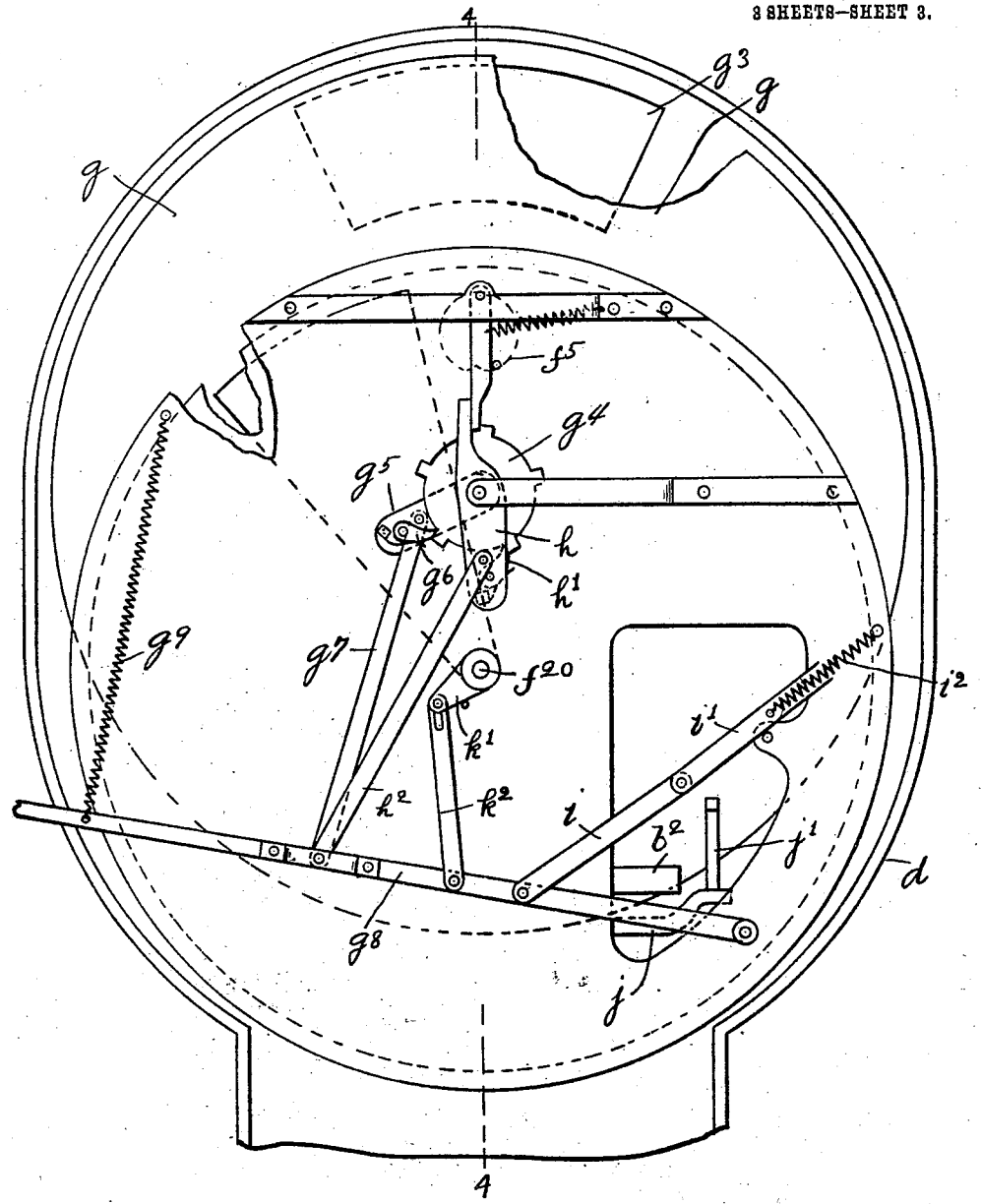

Figure 1 shows in front elevation a weighing machine embodying this invention. Fig. 2 is an enlarged front elevation of the head of the machine, the front plate being broken away to expose the parts which are concealed by it. Fig. 3 is a rear side view of the head of the machine, the back plate being removed. Fig. 4 is a vertical section of the head of the machine taken on the dotted line 4—4 of Fig. 3.

$a$ represents the base of the machine, $b$ the movable platform, $c$ a column rising from the base $a$ which contains the platform rod $b'$, $d$ a circular or other shaped head which is mounted on the column $c$ and which contains the operating parts of the weighing-mechanism and also of the advertising-device.

The platform rod $b'$ is connected at its upper end to a cross-bar $b^2$, to which the lower ends of the weighing springs $e$, $e$, are attached, and the upper ends of said springs are attached to a cross-bar $e'$, which is supported at the top of the head $d$.

A rack-bar $f$ is formed upon or erected on the cross-bar $b^2$, which extends upward, and its teeth engage a pinion $f'$, secured to a sleeve $f^2$ mounted on a shaft $f^{20}$, having its bearings centrally disposed in the head $d$. A circular indicating-plate $f^3$ is secured to the sleeve $f^2$, having on its front face numerals designed to indicate the weight, and said indicating-plate is located back of a front plate $f^4$ having a sight opening $f^5$, through which anyone of the numerals on the indicating-plate $f^3$ are observable. When a person mounts the platform the indicating-plate will be turned and the numeral thereon, indicating the weight, will be brought into position back of the sight opening $f^5$.

The mechanism thus far described is common in weighing-machines and is herein shown merely for the sake of illustrating my invention, and I desire it to be understood that my invention comprehends the employment of any equivalent form of weighing-mechanism by which the weight of the person standing on the platform may be indicated through a sight opening.

The advertising-device consists essentially of a disk $g$ secured to a shaft $g'$ having its bearings in the frame at a point above the shaft $f^{20}$, and said disk is located in the back part of the head and has printed or otherwise provided on its front side or face a plurality of advertisements. The head of the machine is provided with an extension $g^2$ at the top, the front plate of which is formed with a display opening $g^3$ for the advertisements, back of which the advertisements will be successively brought to view as the disk is turned. A toothed wheel $g^4$ is secured to the shaft $g'$ having any desired number of teeth thereon, although preferably having as many teeth as there are advertisements on the disk $g$. An arm $g^5$ is also arranged loosely on the shaft $g'$ bearing a pawl $g^6$ adapted to engage the teeth of said wheel $g^4$ and which is held in engagement with said wheel by a spring and said arm $g^5$ is connected by a link $g^7$ with a pivoted lever $g^8$ which extends through a slot in the side of the head and is provided at its outer end with a hand piece by which it may be depressed. A spring $g^9$ is attached to said lever which normally holds it in its elevated position or which returns it to its elevated position when said lever is depressed. Depression of said lever operates to turn the advertising-disk to display the next advertisement of the series at the display opening. Another arm $h$ is also mounted loosely on the shaft $g'$, bearing a pawl $h'$ which is held pressed into engagement with said toothed wheel $g^4$ by a spring, and said pawl carrying arm is connected by a link $h^2$ with the pivoted lever $g^8$. Depression of the lever $g^8$, therefore, also operates to move the pawl carrying arm $h$ in order that its pawl may engage the next tooth of the wheel $g^4$ preparatory to turning said wheel and thereby moving the advertising disk another step to display the next advertisement when the arm $g^8$ is raised or returned to its normal elevated position.

A toggle comprising the pivotally connected members $i$ and $i'$ is connected at one end to the frame and at the other end to the actuating lever $g^8$ and the spring $i^2$ is attached to one of said members, as $i'$ for instance, which acts to hold the toggle in a certain position to hold the actuating lever $g^8$ depressed. The toggle is straightened by depression of the actuating lever and is then operated by the spring to lock it.

An arm $j$ is connected with the platform rod bearing at its extremity an upright pin $j'$ which is located beneath the member $i'$ and which is adapted to engage said member and raise it when the weight is removed from the platform and the latter permitted to rise to thereby unlock the toggle and permit the actuating-lever $g^8$ to resume its normal position.

When the actuating lever is depressed by hand it will become automatically locked in its lowermost position and when the weight is removed from the platform said locking-device will be automatically released and the actuating-lever permitted to resume its normal elevated position; and the advertising-device will be operated one step when the actuating-lever is depressed and another step when the actuating-lever is raised.

A plate or screen $k$ is located back of the sight opening $f^5$ and in front of the indicating disk, which conceals the numeral on said disk back of the sight opening, and said screen is secured to the shaft $f^{20}$ and is moved by said shaft to uncover the sight opening in order that the numeral indicating the weight may be observed. The shaft $f^{20}$ has an arm $k'$ secured to it which is connected by a link $k^2$ with the actuating-lever $g^8$. Depression of said actuating-lever $g^8$ rocks the shaft $f^{20}$ and moves the screen.

Thus it will be seen that when a person mounts the platform the indicating-plate will be turned to bring the correct numeral indicating the weight back of the sight opening, but in order that the person may observe the numeral indicating the weight, the actuating-lever $g^8$ of the advertising-device must be operated. Therefore, to obtain the weight the advertising-device must be operated and a new advertisement presented to view at the display opening.

Having thus described my invention, what I claim as new and desire to secure by Letters Patent is:—

1. In a weighing machine, the combination of weighing-mechanism connected with and operated by a movable platform and having a movable indicator, a front plate having a sight opening back of which said indicator is located and also having a display opening, a screen located back of the sight opening, an advertising-device located back of said front plate having a plurality of advertisements adapted to be successively displayed at said display opening and means for operating said advertising-device to display a different advertisement and also to move the screen to uncover the sight opening, whereby the indicator will be exposed only when the advertising device is operated, substantially as described.

2. In a weighing machine, the combination with weighing-mechanism connected with and operated by a movable platform and having a movable indicator, a front plate having a sight opening back of which said indicator is located and also having a display opening, an advertising-device located back of said front plate having a plurality of advertisements adapted to be successively displayed at said display opening, an operating-device for said advertising-device, a screen for said sight opening adapted to be moved by said operating-device to uncover the sight opening whenever the advertising-device is operated, substantially as described.

3. In a weighing machine, the combination with weighing-mechanism, connected with and operated by a movable platform and having a movable indicating-plate, a stationary front plate having a sight opening back of which said indicating plate is located and also having a display opening and a screen for said sight opening, an advertising-disk located back of said front plate having a plurality of advertisements adapted to be successively displayed at said display opening, and means for operating said advertising-disk to display a different advertisement and simultaneously move the screen to uncover the sight opening, substantially as described.

4. In a weighing machine, the combination with weighing-mechanism connected with and operated by a movable platform and having a movable indicating-plate, a stationary front plate having a sight opening back of which said indicating-plate is located and also having a display opening, a screen for said sight opening, a rotatable advertising-disk located back of said front plate having a plurality of advertisements adapted to be successively displayed at said display opening and a pivoted operating lever for said advertising-disk with which said screen is connected, whereby the sight opening will be uncovered whenever the advertising-disk is turned, substantially as described.

5. In a weighing machine, the combination with weighing-mechanism connected with and operated by a movable platform and having a movable indicator, a front plate having a sight opening, a screen for said sight opening, an advertising-device having a plurality of advertisements, means for operating said advertising-device to successively display the advertisements and also to move the screen to uncover the sight opening, whereby the indicator is exposed only when the advertising-device is operated and a different advertisement displayed, substantially as described.

6. In a weighing machine, the combination with weighing-mechanism connected with and operated by a movable platform and having a movable indicator, a front-plate having a sight opening, a screen for said sight opening, an advertising-device having a plurality of advertisements, an operating-device for said advertising-device, adapted to operate it to successively display the advertisements and also to move the screen to uncover the sight opening, a locking-device for said operating-device adapted to lock it in its abnormal position, and means operated by the rising platform for releasing said locking-device, substantially as described.

7. In a weighing machine, the combination with weighing-mechanism connected with and operated by a movable platform and having a movable indicator, a front-plate having a sight opening, a screen for said sight opening, an advertising-device having a plurality of advertisements, an operating-device for said advertising-device adapted to be operated manually to operate the advertising-device and also uncover the sight opening and adapted to be operated by means controlled by the rising platform to again operate the advertising-device and cover the sight opening, substantially as described.

8. In a weighing machine, the combination with weighing-mechanism connected with and operated by a movable platform and having a movable indicator, a front-plate having a sight opening, a screen for said sight opening, an advertising-device having a plurality of advertisements, a pivoted actuating-lever adapted to be operated manually to operate the advertising-device and uncover the sight opening, a spring for returning said actuating-lever to again operate said advertising-device and cover said sight opening, a locking-device for said actuating-lever and means operated by the rising platform for releasing said locking-device, substantially as described.

In testimony whereof, I have signed my name to this specification, in the presence of two subscribing witnesses.

ROBERT G. HOWARD.

Witnesses:
B. J. NOYES,
L. H. HARRIMAN.